H. C. GAMMETER.
DUPLICATING MACHINE.
APPLICATION FILED JAN. 3, 1910.

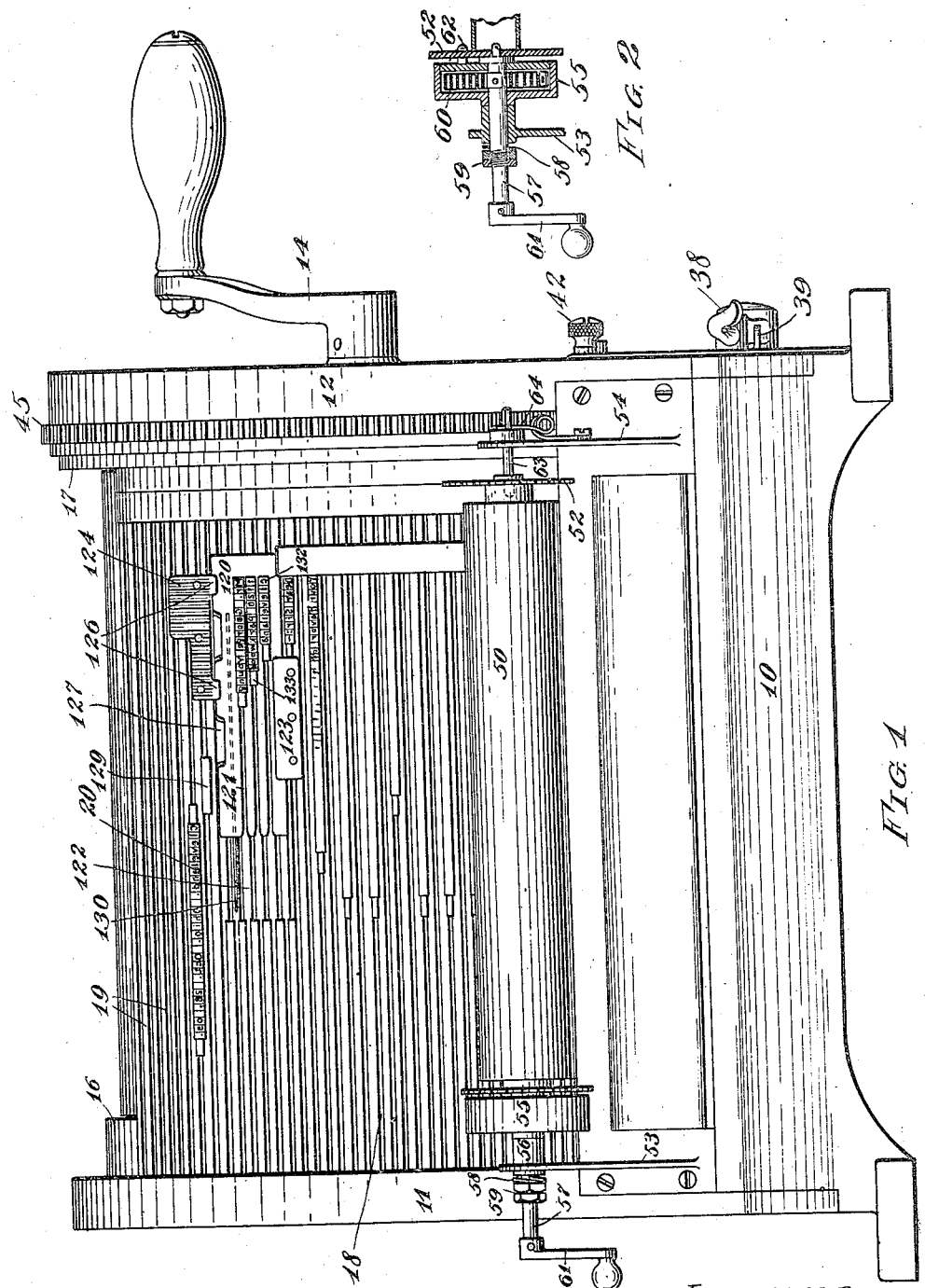

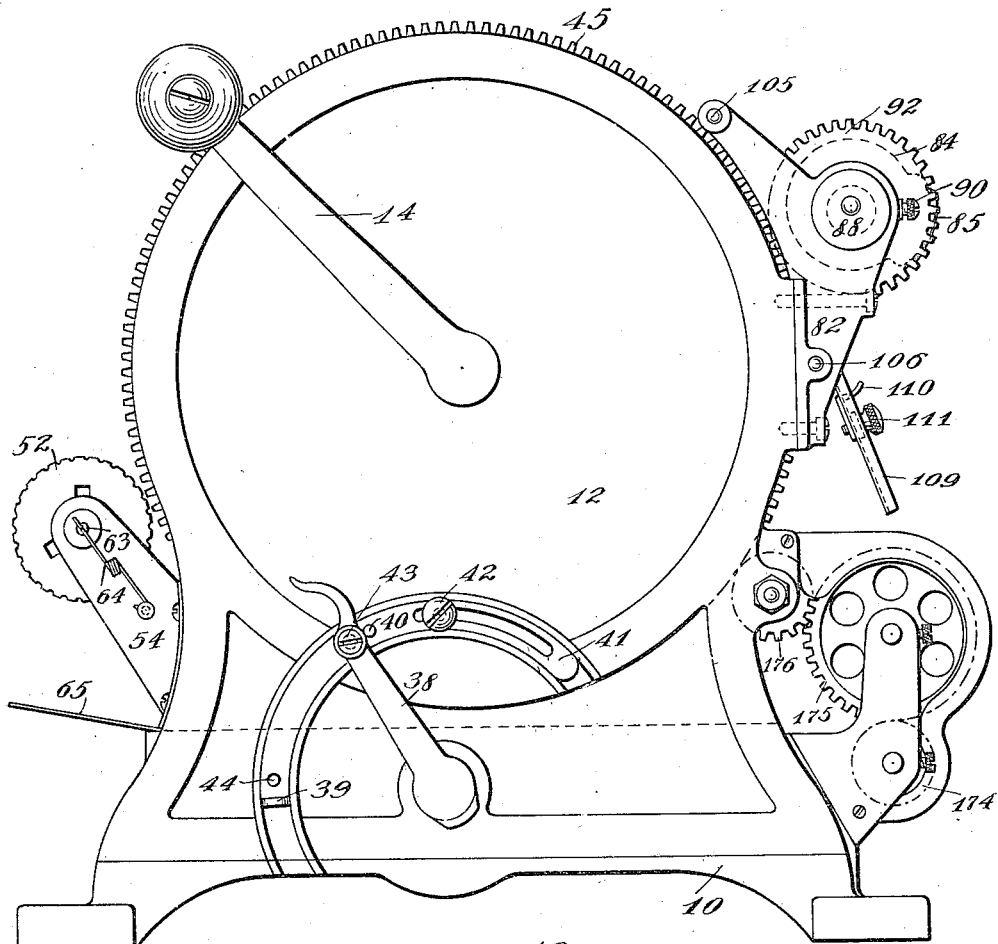
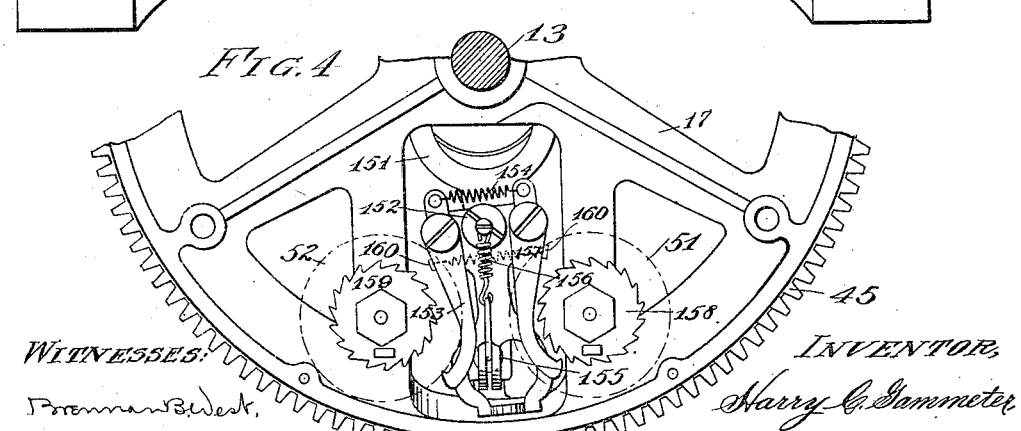

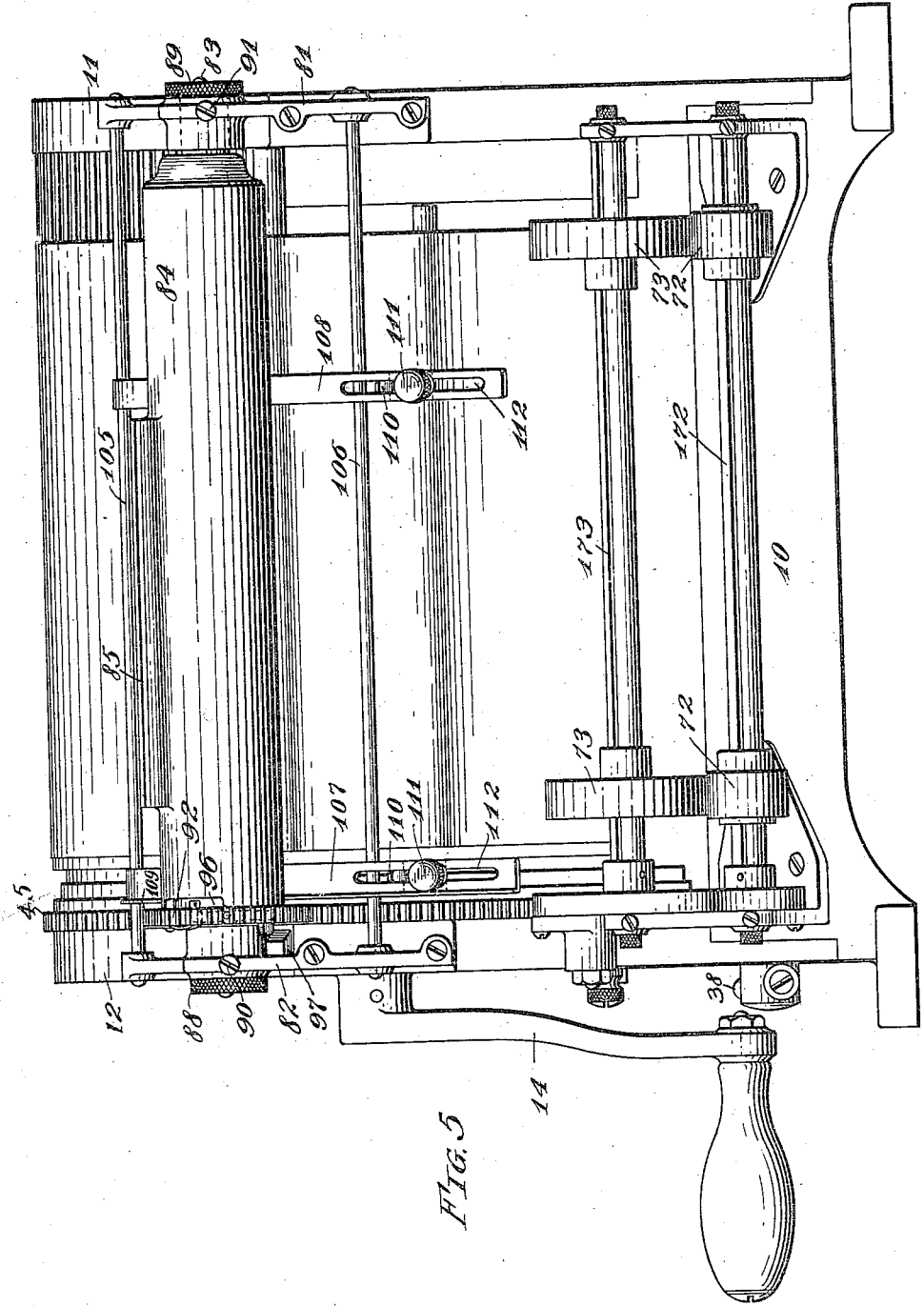

1,122,722.

Patented Dec. 29, 1914.
5 SHEETS—SHEET 4.

WITNESSES:
Brennon B. West
A. L. Lord

INVENTOR,
Harry C. Gammeter,
By Baker Foulk Hull
ATTY'S.

H. C. GAMMETER.
DUPLICATING MACHINE.
APPLICATION FILED JAN. 3, 1910.
1,122,722.
Patented Dec. 29, 1914.
5 SHEETS—SHEET 5.
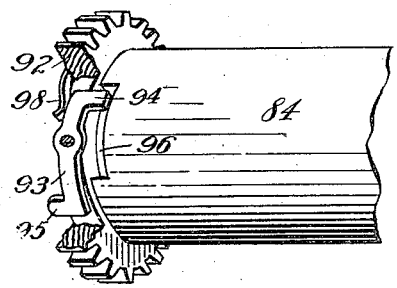
FIG. 9
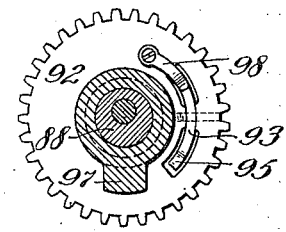
FIG. 10
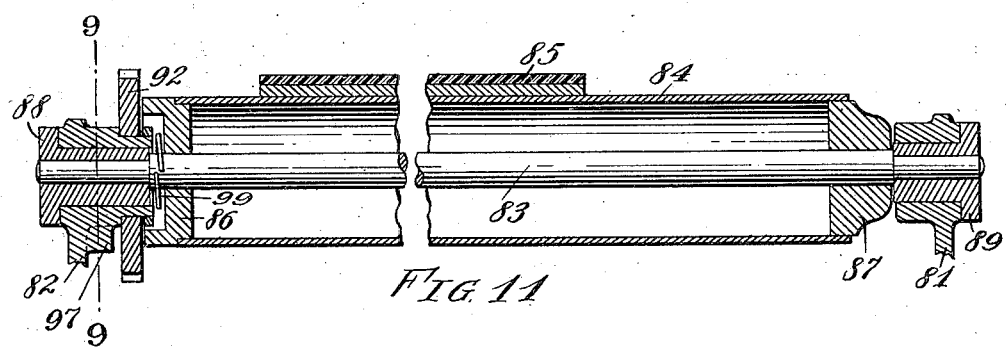
FIG. 11
FIG. 12
WITNESSES:
Foreman B. West.
A. L. Lord.
INVENTOR,
Harry C. Gammeter
BY Bates, Foutz & Hull,
ATTYS.

UNITED STATES PATENT OFFICE.

HARRY C. GAMMETER, OF BRATENAHL, OHIO, ASSIGNOR TO THE AMERICAN MULTIGRAPH COMPANY, OF CLEVELAND, OHIO, A CORPORATION OF OHIO.

DUPLICATING-MACHINE.

1,122,722.

Specification of Letters Patent.

Patented Dec. 29, 1914.

Application filed January 3, 1910. Serial No. 535,962.

*To all whom it may concern:*

Be it known that I, HARRY C. GAMMETER, a citizen of the United States, residing at Bratenahl, in the county of Cuyahoga and State of Ohio, have invented a certain new and useful Improvement in Duplicating-Machines, of which the following is a full, clear, and exact description, reference being had to the accompanying drawings.

One of the objects of this invention is to provide a simple and efficient duplicating machine having the capacity of rapidly printing matter with a portion of the form successively changed.

My invention is especially designed for printing circular letters, wherein the body of the letter is the same for successive impressions and the address is changed.

Another object of the invention is to provide such mechanism that an impression may be made from the changeable part of the form without printing the balance of the form. This is of especial value in printing the addresses on envelops to match the addressed letter.

Another object of the invention is to endow the mechanism with a capacity for printing the letter and the envelop alternately and delivering the same adjacent to each other.

Another object of the invention is to provide for printing both circular letters and the envelops in imitation of typewriting, the impression being made by type of typewriter pattern through an ink-carrying fabric.

Another object is to provide the mechanism in such form that the change from one kind of operation to another may be made quickly and easily.

Among other objects may be mentioned provisions for effectively feeding and controlling the ribbon; for allowing the removal of the type form as a whole; and, in general, for rendering the construction efficient.

The invention may be most conveniently summarized as consisting of the combinations of coöperating parts by which I accomplish the above-mentioned objects or any of them, as set out in the claims.

Figure 6:
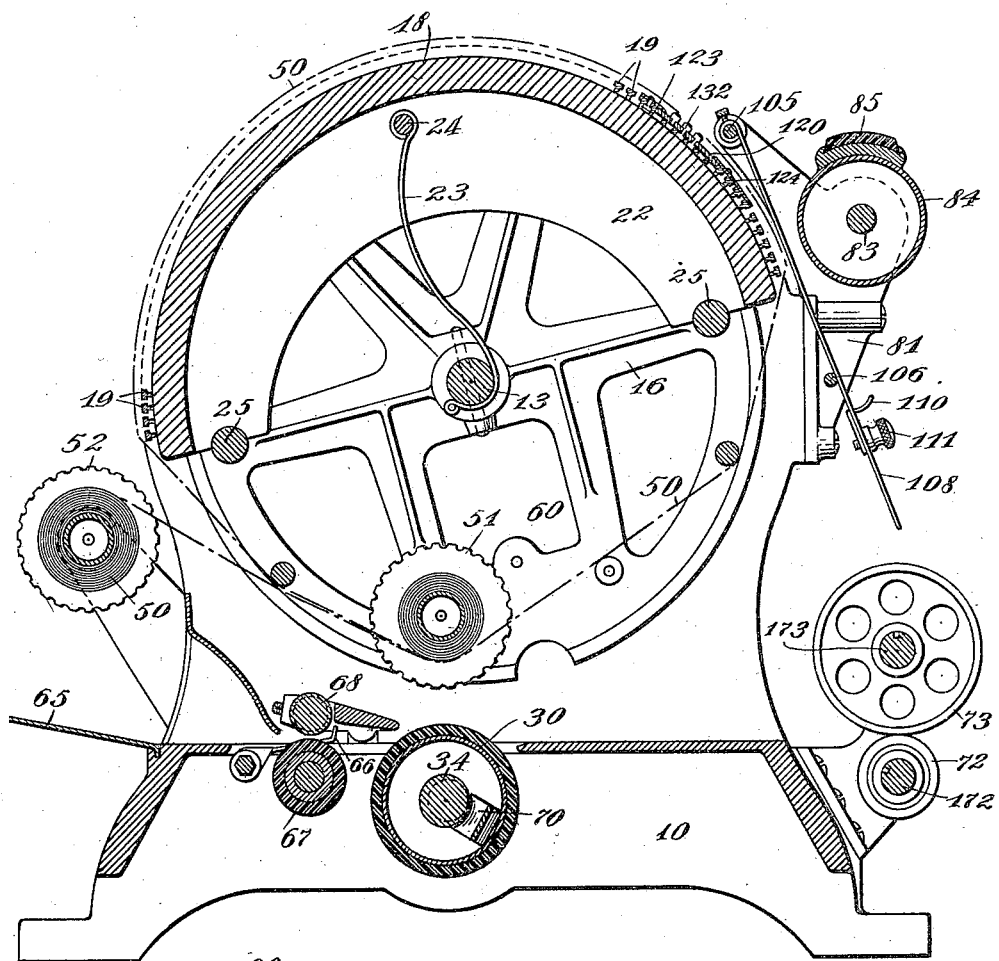
Figure 7:
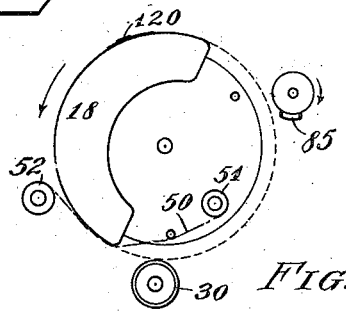
Figure 8:
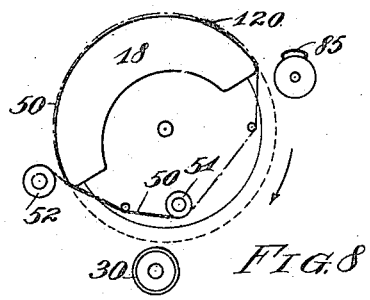

In the drawings—Figure 1 is a front elevation of my machine; Fig. 2 is a vertical section through the spring barrel shown in Fig. 1; Fig. 3 is an end view of the machine; Fig. 4 is a vertical section through the rotatable printing member, looking in the opposite direction to Fig. 3 and showing the ribbon feed; Fig. 5 is a rear elevation; Fig. 6 is a vertical section in a plane parallel with Fig. 3; Figs. 7 and 8 are diagrams illustrating the course of the ribbon and the operation of the platens for printing the letter and the envelop respectively; Fig. 9 is a perspective view of the driving end of the platen for printing the envelops; Fig. 10 is a detail illustrating the clutch for the envelop platen, being a vertical section on the line 9—9 of Fig. 9; Fig. 11 is an axial section of the envelop printing platen; and Fig. 12 is an axial section of the platen for printing the letter.

In the embodiment shown, my machine is of a rotary or oscillating character, having a printing drum-like member carrying the letter and address forms and arranged by a rotation in one direction to co-act with one platen to print a letter and by a rotation in the opposite direction to co-act with another platen to print the envelop, the address being changed after each pair of such rotations.

The frame of the machine, as shown, comprises a suitable base 10 and uprights 11 and 12, which latter are preferably end plates for the rotatable typeholder mounted between them.

The typeholder comprises a drum-like member mounted on a shaft 13 journaled in the end plates and provided with a suitable driving mechanism, as the crank 14. As shown, the drum-like member is made up of suitable rings or spiders 16 and 17, mounted on the shaft 13, and a removable segment 18 which rests on such spiders and is clamped to the shaft 13 and has rails 19 adapted to carry parallel lines of individual type. The rails 19 may overhang, and the type may have grooves on their opposite sides and occupy channels between the successive rails, as indicated by the type 20. The address may be made of similar type carried by a plate 120 removably mounted in a recess in the segment 18.

The removable typeholding segment is of the general character shown, described, and claimed in my Patent No. 1,094,065. In the form herein shown it constitutes the subject matter of my divisional application No. 823,051, and comprises, beside the segmental rim portion 18 a plurality of arcual internal webs 22 rigid with the rim portion, and a sheet metal hook 23 which is hinged to the webs by a rod 24 mounted therein, and at its other end is rolled to spring around and engage the shaft 13. This hook by being of spring metal, and being normally bent intermediately, as shown in Fig. 6, has the capacity to spring around the shaft 13 and at the same time retain a firm hold thereon. When the spring hook is in the position shown the segment is firmly held with its rim seating on the spiders 16 and 17. In this position the webs substantially abut suitable bars 25 connecting the spiders. The drum opposite the segment is open, so that there is convenient access to the hook 23 for removal and replacement of the segment.

30 indicates a suitable roller platen mounted parallel with the printing drum and having a soft cylindrical surface adapted to coöperate with the type on the drum. As shown more particularly in Fig. 12, this soft surface is placed about a metal shell 31 which has hardened bushings 32 and 33 journaled on a shaft 34. This shaft has reduced eccentrically-placed extensions 35 and 36 which are journaled in the end frame members 11 and 12. The platen is thus eccentrically mounted and may be adjusted toward or from the printing drum by turning the shaft. This adjustment may be made by hand, whenever desired, by means of an arm 38 on the extension 36 which is adapted to swing between stops 39 and 40 on an arc-shaped bar 41 mounted between guides on the end plate 12 and clamped by a set screw 42. The arm 38 may carry a screw 43 or other device adapted to occupy a depression 44 in the arcual bar, to lock the platen in idle position whenever desired. While the lever 38 provides manual means for raising and lowering the platen, I also provide automatic means for raising and lowering it, which will be described later.

The drum spider 17 carries a gear 45 which is adapted to drive the platen. Connection from this gear to the platen may be made in any suitable manner, but I prefer to provide a gear 46 mounted on the shaft extension 36 and having a loose connection with the platen to enable the adjustment thereof, heretofore referred to, without shifting the gear. Such loose connection may be made by pins 47 on the gear engaging slots 48 in the end of the platen.

To ink the type whereby it may print upon paper drawn between it and the platen, I provide an inking ribbon 50, one end of which is mounted on a spool 51 journaled in the spiders 16 and 17. The other end of the ribbon is mounted on a spool 52 which is carried by the frame and connected with a spring barrel. Thus, as shown in Figs. 1 and 3, the spool 52 is journaled at the front of the machine on the end of short arbors 57 and 63 mounted in suitable stationary brackets 53 and 54.

A spiral spring 60 is provided within a casing 55, loose on the arbor 57 and connected by a pin 62 with the flange of the spool. This spring connects at one end with the casing, and at the other with the arbor 57. This arbor has a regulated brake engagement with the bracket 53, by means of a spring washer 58 between the bracket and nuts 59 on the shaft. The operation of this spring connection is to allow the ribbon to be pulled off of the spring barrel and wrapped around the drum during printing movement, and on the reverse movement to wind in the ribbon on the barrel, this action being accordingly similar to that of a shade roller.

I prefer to provide mechanism on the rotatable skeleton frame for periodically feeding the ribbon, as by giving the spool 51 a partial rotation for each rotation in the proper direction of the printing drum. Such feeding mechanism, for example, may be a ratchet mechanism made in accordance with my Patent No. 997,287 and illustrated herein in Fig. 4. Briefly, the parts there shown comprise a reciprocating bar 151 mounted on the end spider 17 and connecting with a stationary eccentric surrounding the shaft 13, whereby the bar is reciprocated in or out as the drum turns; a plate 152 pivotally mounted on the bar; a pair of pawls 153 and 157 pivotally mounted on the plate; a spring 154 acting to force the pawl noses outwardly; spring constrained lips 160 to limit the outward movement; and a spring detent comprising a roller 155 and a spring 156 tending to hold the plate 152 in either of two extreme positions. When in the position shown in Fig. 4, the pawl 157 is in position to engage the ratchet 158 of the spool 51. The other pawl is idle in the position shown. When the spool 52 is mounted on the spring barrel, the feeding is always on the spool 51.

As the gradual feeding of the ribbon onto the spool 51 increases the spring tension in the spring barrel, the spring washer 58 allows slippage of the shaft 57, so that the tension on the ribbon is maintained approximately constant. This tension may be regulated, as required, by turning the shaft 57 by its crank 61.

The spool 52 is readily removable, by pressing it toward the right (Fig. 1) to release its connection with the casing 55, and then tipping it and removing it from the pin 63. The spring 64 allows this movement. When removed from the mounting described, the spool may be mounted in the drum parallel with and adjacent to the spool 51, as shown in Fig. 4 and also, for example, in my Patents Nos. 997,287 and Reissue 12,622. When both spools are mounted in the drum, as shown in Fig. 4, the tautness of the ribbon when entirely wound on the spool 51 (by reason of anchoring the pawl 157) causes the plate 152 to automatically swing to bring the pawl 153 into position to coöperate with the ratchet 159 of the spool 52, thus the ribbon automatically reverses itself.

As heretofore stated, my machine operates by giving substantially a rotation in one direction to effect the printing of the body and address, and a rotation in the opposite direction to effect the printing of the envelops.

Figs. 1, 3 and 7 show the position of the parts as the printing of the letter is about to begin. The sheet of paper to be printed is placed on the table 65 against suitable stop fingers 66, (Fig. 6) and then as the crank is rotated in the left-hand direction the spool 51 travels rearwardly and upwardly and the type form swings downwardly on the front end of the machine, and at the proper time the paper is released and fed rearwardly by feed rollers 67 and 68. In such movement the paper passes between the drum and platen. Now, this left-hand movement of the printing drum rotates the platen by means of the gears 45 and 46, and, by means of a frictional connector between the platen and its shaft, this rotation of the platen in the right-hand direction automatically turns up the shaft 34 so as to elevate the platen and bring it into printing position. The frictional device in the form shown consists of a sinusoidal spring 70 placed within the platen shell and bearing on the inner surface of the shell and on the shaft 34. Suitable cam and lever mechanism (not shown) operate at the proper point in the rotation of the drum to swing down the feed roll 68 and the fingers 66, so that the paper is freed and is fed by the driven roller 67 and the concurrently rotating roller 68. Such feeding mechanism may, for example, be of the type shown in my Patent No. 846,992. Accordingly, when the drum is given this left-hand rotation the platen is automatically turned up into active position, and the paper, with the ribbon above it, passes between the platen surface and the type on the drum and is thereby impressed. In such movement the sheet passes between the ejecting device consisting of a rubber roll 72 and surmounting steel rolls 73 and is thereby delivered. Both rolls are slidably mounted on shafts 172 and 173, respectively, by feathers on the rolls engaging grooves in the shaft, whereby the rolls may be adjusted for different widths of paper. The shafts are geared together by meshing gears 174 and 175, the latter of which meshes with an idler 176, which, in turn, meshes with the drum gear 45. Now, as soon as the crank has made substantially a rotation in the left-hand direction, resulting in the printing of the letter with its body and address and the delivery of the same, as described, the crank is given a rotation in the right-hand direction to print the envelop by the same address form through the same inking ribbon. The mechanism by which this operation is effected will now be described.

In the embodiment shown, mounted on the rear edge of the plates 11 and 12 are brackets 81 and 82 in which is rotatably mounted the shaft 83 carrying a roller 84 on which is mounted a soft segmental platen 85 for printing the envelop. The roller 84 may be a sheet metal shell, and heads 86 and 87, or other construction as desired. The mounting in the brackets 81 and 82 is adjustable, by reason of the ends of the shaft 83 extending into eccentrically placed bores in bushings 88 and 89. These bushings have knurled heads by which they may be turned and are clamped by suitable set screws, as 90 and 91. The arcual extent of the surface of the platen 85, or the position of this platen on its roller, is such that the platen is adapted to co-act with the address portion only of the form.

To cause the envelop platen 85 to revolve coactingly with the address form, but to be idle while the rest of the drum is passing the platen, I provide the following mechanism: Mounted on the hub of the bracket 82, or in other suitable manner, is a gear 92 which meshes with the gear 45 and is thus rotated whenever the drum is rotated. Pivotally mounted within a slot in this gear, on a radial axis, is an arc-shaped dog 93 (Figs. 5, 9 and 10). This dog has a pair of oppositely projecting lugs 94 and 95. The lug 94 occupies an elongated slot 96 in the head 86 of the platen roller. The lug 95 projects beyond the outer face of the gear in position to engage a stationary cam projection 97 carried by the bracket 82. A spring 98 carried by the gear 92 and acting on the dog tends to keep it with the lug 94 in the slot 96.

The result of the operation of the above described mechanism is that when the printing drum is rotated in the left-hand direction to print the letter, the platen roller 84 rotates correspondingly, with the platen 85 in idle position, because it is passing the drum when the open space thereof is at the rear. When such rotation brings the platen segment 85 into an upwardly extending position, the lug 95 engages the cam 97 which swings the dog 93 to withdraw the lug 94 from the slot 96. The cam holds the lug 94 withdrawn until the rotation has carried the lug 94 beyond the slot 96, whereupon the continued rotation of the gear 92 carries the lug around on the end of the platen head 86, a friction brake (provided by a split washer 99, or other suitable means) holding the platen in stationary position. Accordingly, this printing rotation of the drum gives no effective operation to the envelop platen, but simply turns it to proper position and then leaves it there during the rest of the rotation. The position of the parts at the end of the left-hand rotation is shown in the diagram, Fig. 8. Now, after the reverse rotation has begun, (that is, the right-hand rotation of the drum) the dog 93 springs back into the slot 96 and drives the platen roller so that the segmental platen 85 swings downwardly toward the front just as the address form is swinging downwardly toward the rear, and the two coöperate to print an envelop placed between them.

I provide a support for the envelop while it is being printed, consisting of a pair of stationary rods 105 and 106 carried by the brackets 81 and 82 and a pair of slidable bars 107 and 108 mounted on these rods. The bar 107 preferably has an edge guide 109. The bars may be slid along the rods to any desired position. Each bar is provided with an adjustable foot stop consisting of the lip 110 clamped to the bar by a suitable set screw 111 which is slidable in the up-and-down slot 112 in the bar. Preferably after the letter has been printed and before the reverse rotation begins (or in the vicinity of this momentary pause) the envelop is placed on the guides 107 and 108 against the feet 110, with its flap downward and toward the rear; that is, the envelop is upside down and facing the printing drum. Now, on continued right-hand rotation of the drum, the address form swings onto the face of the envelop and the segmental platen 85 at the same time comes onto the rear of the envelop, so that the envelop is gripped between them, and as the address type and platen roll on each other, the lower edge of the envelop buckles free from the foot stops 110 and is fed by the address type and platen, so that the address is printed on the envelop by a rolling impression. Furthermore, the envelop is automatically fed downwardly by such movement, so that at the completion of this rolling coaction the printed envelop drops onto the ejected printed letter to which it corresponds. At the beginning of this right hand rotation of the drum the main platen 30 is automatically thrown to idle position by its frictional grip on the eccentric shaft, and remains in this position throughout the rotation.

The position of the ribbon and the main platen and envelop platen at the beginning of the envelop printing movement, as stated, is illustrated by the diagram in Fig. 8. After the envelop has been printed, the movement is continued for substantially the remainder of a complete rotation, and thus return the parts to initial position, that is the position shown in Fig. 1. In this position the address plate 120 may be removed and a new plate substituted, as will now be described.

The removable address plate 120 and the means for securing it in place are shown, described and claimed in my Patent No. 1,088,410. Briefly, the plate 120, as shown, is a segmental sheet of metal having slots 121 extending from one end well toward the other end, which slots leave between them tines adapted to aline with the heads of rails 19, when the plate occupies a suitable recess 122 in the drum. The address plate when in place rests on web portions of the rails at the recess 122, and its surface is flush with the outer surface of the drum. These rail webs support the plate between consecutive lines of type. These lines of type are indicated at 132, in Fig. 1. They consist of individual type grooved on their opposite sides and are identical with the main printing type, and held in place by suitable elastic plugs 133. In position the plate is held by a suitable clip 123 which overhangs one edge and a slidable clip 124 overhanging the other. Each of these clips is held in place by suitable ribs, (not shown) occupying the under-cut channels between consecutive rails and secured to the clips by rivets, shown in Fig. 1. The clip 123 preferably engages the drum with sufficient friction to render it normally immovable, while the clip 124 is slidable lengthwise of the drum, with more or less freedom, the clip preferably having a roughened or corrugated upper surface to enable it to be easily moved by the operator's fingers. The clip 124 has a pair of tongues 126 which are adapted to overlap the edges of the plate 120, or to aline with suitable notches in that edge, such alining taking place when the clip abuts a stop 129. A suitable spring 130 tends to elevate the edge of the plate adjacent to the clip 124. Now, when it is desired to replace the plate by one carrying a new address—(which is preferably done in the pause between right hand and left hand rotations), the operator slides the clip 124 to the left, until the tongues 126 aline with the notches 127. The spring 130 thereupon elevates the free edge of the address plate and the same is picked out by the operator's fingers and a new plate tucked under the clip 123, pressed down against the spring 130 and locked in place by the clip 124, being slid to the right over the top of the plate. This operation of unlocking the plate, removing it, placing a new plate and locking it, may be performed by the operator with one hand, with great rapidity. When the new plate is in place the machine is operated as before, first by a left-hand rotation to print the body and address on the letter, deliver the letter and bring the address above the envelop platen, then by a right-hand rotation to print the envelop, and return the type form to uncovered position for installing a new address plate.

As shown in the drawings, the salutation is carried by the printing drum, but it may be carried by the address plate, another slot being provided therein for that purpose. In either case, the salutation may very conveniently be a logotype, as but three salutations are ordinarily used,—"Dear Sir," "Dear Madam," "Gentlemen." Whether the salutation is carried by the drum or the plate, the platen 85 is so positioned as to miss it when the envelop is printed.

It will be seen that my invention provides a very efficient machine by which the body of the letter with an address and the envelop may be printed to match, the envelop being delivered on the printed letter, and both imprints being effected by the same character of type through the same inking ribbon and by the same kind of pressure. The machine may be used simply for printing envelops, being rotated back and forth through sufficient portions of opposite rotations which allow for the printing of the address and the replacement of the plate. During such movement the main platen 30 may be held permanently idle by turning the screw 43 into the depression 44. On the other hand if it be desired to print an address on the letter but no envelop, the envelop platen is thrown to permanently idle position by turning the eccentric bushings in which its shaft is mounted. If no address at all is to be printed, the address plate may be simply removed and the drum oscillated to print the body of the letter. Or, for this latter character of work, the spool 52 may be disconnected from the spring barrel and mounted in the rotatable drum with the ribbon passing across the type, and the drum rotated continuously in the left-hand direction.

Having thus described my invention, what I claim is:—

1. In a machine of the character described, the combination with means for carrying a form for the body of a letter and a removable address form, of two platens, and means whereby one coöperates with both the body and address and the other with the address only while it is in the same position with relation to the body, whereby the machine may print addressed letters and corresponding envelops.

2. In a machine of the character described, the combination with means for carrying a form for the body of a letter and a removable address form, of two platens, and means whereby one coöperates with both the body and address and the other with the address only, and an inking fabric adapted to cover both forms and periodically uncover the address form.

3. The combination of a printing member having a printing form and a separable address form adapted to be mounted on the member, and coöperating mechanism for causing said forms to print an addressed letter by a movement of said printing member in one direction and a corresponding envelop from the same address form by movement of the printing member in another direction.

4. The combination, with an inking fabric, of a printing member having a separable address form and a coöperating mechanism for causing the printing member to print an addressed letter by a movement in one direction and a corresponding envelop by means of the same address form by movement in another direction, both imprints being through the same inking fabric.

5. The combination of a rotatively movable printing member carrying a body form and a removable address form, of means for making a pair of imprints consisting one of the body and address and the other of the address alone, without changing the relation of the address and body.

6. The combination, with a fabric, a member mounted to turn on an axis, and a platen for making a series of imprints each consisting of a body and an address through the fabric by rolling contact, of means for intermediately printing an envelop, both imprints being through the same fabric.

7. The combination, with a fabric, of a printing member and two platens for printing by rolling impression an addressed letter and an envelop using the same address form, both through the same fabric and delivering them one on top of the other.

8. The combination of a printing member having a body form and a separable address form adapted to move back and forth, and means whereby the movement in one direction may print an addressed letter and movement in the other direction may print an envelop by the same address form.

9. The combination of a printing member adapted to move back and forth and coöperating means whereby the movement in one direction may print two portions of a form and movement in the other direction may print one portion only of the same form.

10. The combination of a printing member adapted to move back and forth, two platens, one coöperating with a portion of the member in one direction of movement and the other coöperating with a part of the same portion of the member in the other direction of movement.

11. The combination of a printing member, two platens, one coöperating with the whole form on the member in one direction of movement and the other coöperating with part of said form on the member in the other direction of movement, and an ink carrying fabric coöperating with both platens.

12. The combination of an oscillating printing member and two platens side by side, with each of which it has rolling contact, means for guiding a sheet of paper to be printed between the printing member and one platen, and means for guiding an envelop to be printed between the printing member and the other platen.

13. The combination, of a printing member adapted to move back and forth, two platens, one coöperating with a combined form on the member in one direction of movement and the other coöperating with a portion of such form on the member in the other direction of movement, and means for guiding a sheet of paper to be printed between the printing member and one platen, and means for guiding an envelop to be printed between the printing member and the other platen.

14. The combination of a rotary printing member adapted to turn in either direction and carry a page form and a removable address, and two platens, one adapted to coöperate with the page form and address in one direction of rotation of said member and the other to coöperate with the address alone in the other direction of rotation.

15. The combination of a rotary printing member adapted to turn in either direction and carry a page form and a removable address, two platens, one adapted to coöperate with the member in one direction of rotation, and the other to coöperate therewith in the other direction of rotation, and means for automatically moving either platen to idle position when not wanted.

16. The combination of a printing member mounted to turn in either direction about an axis and carry a page form and an address form, two platens, one adapted to coöperate with both forms in one direction of movement and the other to coöperate only with the address form in the other direction, and an inking fabric adapted to wrap around said member and carry the ink for both impressions.

17. The combination of a rotary printing member adapted to turn in either direction and carry a page form and a removable address form, two platens, one adapted to coöperate with the member in one direction of rotation and the other to coöperate therewith in the other direction, and an inking fabric adapted to wrap around said member and to automatically uncover the address form thereon with successive rotations in alternately opposite directions, one end of the fabric being carried by the printing member and the other independently carried.

18. In a duplicating machine, the combination of a member mounted to turn on an axis, a concentric page form carried thereby, a removable address form also carried thereby in position to act as a portion of the page form, a cylindrical platen formed to coöperate with both forms, and a segmental platen mounted to coöperate with the address form only while it is in said position in the page form.

19. In a duplicating machine, the combination of a member mounted to turn on an axis, a concentric page form carried thereby, a removable address form also carried thereby, a cylindrical platen formed to coöperate with both forms, a segmental platen formed to coöperate with the address only, and an ink-carrying fabric coöperating with both platens.

20. The combination, with a member adapted to hold a page form and an address form in position to act as a part of the page form, of a platen for the combined form and a segmental platen adapted to turn about an axis and coact with the address form while it is in position in the page form without coacting with the rest of the page form.

21. The combination, with a member adapted to hold a page form and an address form in position to act as a part of the page form, of a platen for the combined form and a segmental platen adapted to turn about an axis and coact with the address form without coacting with the rest of the page form, and a single ink-carrying fabric adapted to coact with both forms.

22. The combination, with a member adapted to carry a page form and an address form in position to act as part of the page form, of a segmental platen adapted to coact with the address form only while it retains its position relative to the page form, and a cylindrical platen, side by side with the segmental platen, adapted to coact with both forms.

23. The combination, with a member adapted to carry a page form and an address form, of a segmental platen adapted to turn about an axis and co-act with the address form, a cylindrical platen adapted to co-act with both forms, and an ink-carrying fabric co-acting with both platens.

24. The combination with a member adapted to carry a page form and an address form, of a segmental platen adapted to turn about an axis and co-act with the address form, a cylindrical platen adapted to co-act with both forms, and means whereby either platen is idle while the other is operating.

25. The combination with a member adapted to carry a page form and an address form, of a segmental platen adapted to turn about an axis and co-act with the address form, a cylindrical platen adapted to co-act with both forms, means whereby either platen is idle while the other is operating, and an ink-carrying fabric co-acting with both forms.

26. A printing couple comprising a roller printing member adapted to carry separate forms and two alternately acting platens formed to automatically print by rolling contact two portions of a combined form on one stroke and one portion of the same form on the proximate stroke without changing the position of said portion in the combined form, such operation continuing alternately.

27. The combination of an ink-carrying fabric and a rotative printing couple formed to automatically print two portions of a form on one rotative stroke and one portion of the same form on a proximate rotative stroke without changing the position of said portion in the form, both imprints being through the same ink-carrying fabric.

28. The combination, with a compound form, of an oscillating printing mechanism comprising a printing member carrying said form and two platens formed to print two portions of said form by a stroke in one direction and one portion of the same form by a stroke in the opposite direction.

29. The combination, with a compound form, of an oscillating printing mechanism comprising a printing member carrying said form and two platens formed to print two portions of said form by a stroke in one direction and one portion of the same form by an equal stroke in the opposite direction.

30. The combination, with a compound form, of an oscillating printing mechanism comprising a printing member carrying said form and two platens formed to print two portions of a form by a stroke in one direction and one portion of the same form by a stroke in the opposite direction, there being means whereby the portion of the form which is active in both imprints is intermediately in position to be changed.

31. The combination, with two platens, of a printing member formed to print therewith two portions of a form by a rotating stroke in one direction and one portion of the same form by a stroke in the opposite direction, a single ribbon extending across each form at the time of imprint thereby, there being means whereby the portion of the form which is active in both imprints is intermediately free from the ribbon.

32. The combination of an oscillating printing member carrying two portions of a form, a platen for printing from both portions on one rotative stroke and a platen for printing from one portion alone on the succeeding opposite stroke; and means for automatically bringing said last mentioned portion intermediately of the strokes to a position where it may be changed.

33. The combination of a rotative printing member carrying two portions of a form, means for printing from both portions on one rotative stroke and means for printing from one portion alone on the succeeding stroke, means for automatically bringing said last mentioned portion intermediately of the strokes to a position where it may be changed, and an ink-carrying fabric covering the forms while printing and uncovering one form at the position referred to.

34. The combination, with a combined printing form, of a printing couple comprising a printing member adapted to carry said form, and two platens formed to automatically print by rolling contact alternately from two portions of such combined form and from one portion of the same form while it retains its position relative to the other portion of the form.

35. A printing couple comprising a printing member and two alternately acting platens formed to automatically print by rolling contact alternately from two portions of a form carried on the printing member and from one portion of the same form, and a single fabric through which both imprints are made.

36. The combination with means for carrying a page form, means for carrying an address form, and means for alternately printing by rolling contact both forms and the address form alone without changing its relation to the page form.

37. The combination, with means for carrying a page form and for carrying an address form, an ink-carrying fabric, and means having rolling contact alternately with both forms and with the address form alone for printing through the same ink-carrying fabric.

38. The combination of a movable member adapted to turn on an axis and carry a page form and a separate address form printing by rolling contact, an inked fabric, means whereby both forms and then the address form may be printed successively and alternately through such fabric, and means whereby the address form is periodically freed from the fabric to allow substitution of a different address form.

39. The combination of a movable member adapted to carry a page form and an address form, an inked fabric, a pair of alternately acting platens, whereby both forms and then the address form may be printed successively and alternately through such fabric, and means whereby the address form is periodically freed from the fabric.

40. The combination of means for holding a page form and an address form, an inking fabric adapted to extend over both forms, and means for automatically printing alternately both forms and the address form through such fabric, said means including two platens, one adapted to coöperate with both forms and the other with the address form only, means whereby each platen is idle when the other is active, and means for uncovering the address form between imprints.

41. The combination of a member formed to swing back and forth on an axis, a two-part form carried thereby, coacting impressing means adapted to print on one stroke from both portions of the form and on the opposite stroke from only one portion of such form.

42. The combination of a member formed to swing back and forth on an axis, a two part form carried thereby, coacting impressing means adapted to print on one stroke from both portions of the form and on the opposite stroke from only one portion of such form, and an inked fabric supplying the ink from both impressions.

43. The combination of a movable member adapted to carry two portions of a form, an inked fabric having one end carried by such member and the other end mounted independently of the member, and means for making alternately an impression through the fabric by both portions of the form and by one portion only.

44. The combination of a member adapted to move back and forth and formed to carry a page form and an address form both of which print by rolling contact, an ink-carrying fabric having one end mounted on the movable member and adapted to cover both forms, a platen adapted to coöperate with both forms to print an addressed letter and means for automatically printing the address only through the same fabric.

45. The combination of a member adapted to move back and forth and formed to carry a page form and an address form, an ink-carrying fabric having one end mounted on the movable member and adapted to cover both forms, a platen adapted to coöperate with both forms to print an addressed letter and means for automatically printing the address only through the same fabric, and a spring barrel independent of the movable member and arranged to wind up the free end of the fabric.

46. The combination with a member mounted to turn on an axis and print by rolling contact and adapted to carry two portions of a printing form, means for printing both portions on one stroke of the machine and means for printing one portion only on another complete stroke of the machine without changing the relation of said portion to the other portions, and means for removing the last mentioned portion of the form without disassembling it.

47. The combination of a printing member adapted to turn about an axis and carry two portions of a form, a platen adapted to coöperate with both portions, and a segmental platen mounted opposite the path of travel of both forms and adapted to turn on an axis and coöperate with only one portion.

48. The combination of a rotary printing drum adapted to turn in either direction and carry a page form and an address form, means whereby the rotation in one direction may print both forms and means whereby the rotation in the opposite direction prints simply the address form.

49. The combination of a rotary printing drum adapted to turn in either direction and carry a page form and an address form, means whereby the rotation in one direction may print both forms and means whereby the rotation in the opposite direction prints simply the address form, and a single fabric adapted to lie over both forms.

50. The combination of a rotary printing drum adapted to turn in either direction and carry a page form and an address form, means whereby the rotation in one direction may print both forms and means whereby the rotation in the opposite direction prints simply the address form, and a fabric automatically wrapped around the drum, the fabric being periodically uncovered from the address form and the address form being readily changeable when uncovered.

51. The combination with rotatable mechanism for printing a page form with a changeable address, of means for automatically and alternately printing the address alone without changing its relation to the page form.

52. The combination with mechanism for printing by rolling contact a page form with a changeable address, of means for automatically and alternately printing the address alone, and means for guiding the sheet of paper for the first mentioned imprint, and an envelop for the last mentioned imprint.

53. The combination of a rotary printing member formed to carry a printing surface, means on the member for carrying both ends of a fabric, and a spring barrel independent of the member for carrying one end of the fabric whereby the fabric may be mounted at will either entirely on the member or partly on and partly off the member.

54. The combination with stationarily mounted means for winding up the end of an inking fabric, of a movable printing member to which the other end of the fabric is anchored, and means whereby such printing member may print a body and address by one movement and an address alone by another movement.

55. The combination, with a platen, of a rotatable printing drum, a pair of ribbon spools, means whereby one spool is mounted in the drum and the other spool mounted either in the drum or independently thereof, as desired.

56. The combination with a rotary printing drum, a pair of ribbon spools, means whereby one spool is mounted in the drum and the other spool mounted at will either in the drum or independently thereof, as desired, and a spring barrel adapted to be connected with the last mentioned spool when independently mounted.

57. The combination of a movable printing member, an ink-carrying fabric, a ribbon spool carried by the printing member and having one end of the fabric wound about it, means for periodically feeding said spool, another spool on which the other end of the fabric is wound, a spring barrel connected with the last mentioned spool, an adjustable friction slip device in the mounting of the spring-barrel, and means whereby the spool carried by the spring barrel may at will be transferred to the printing member.

58. The combination of a rotative printing form, a removable address plate adapted to travel therewith, a platen adapted to coöperate with both the printing form and address plate, a printing fabric adapted to overlie both the form and address plate, there being means for relieving the address plate while in printing position in the form of the superincumbent fabric to enable the address plate to be conveniently positioned.

59. The combination, with a roller platen, of a rotative printing member adapted to carry a page form of individual type and having a recess, an address plate adapted to occupy such recess and be in printing position, a fabric through which the page form and address plate may print, there being means for causing the address plate while in printing position in the form to clear said fabric.

60. The combination of a rotatable member, means for carrying on the surface thereof a printing form, a movable address plate adapted to coact with said form and make therewith a combined form to print at the same impression, and a fabric adapted to overlie both the printing form and removable address plate, said fabric being positioned to clear the address plate at one position of the latter while the latter is in said combined form.

61. The combination of a rotatable member, means for carrying on the surface thereof a page form of individual type, a relatively movable address plate adapted to coact therewith, a printing fabric, means for holding the same snugly across the page form and address plate during a printing operation, there being means for relieving the address plate from contact with the fabric while the address plate is coacting with the page form to enable convenient substitution of another plate.

62. The combination of a rotative means for carrying a page form, an address plate movable with reference thereto and adapted to be mounted thereon, a fabric adapted to overlie both the page form and address plate, there being means for periodically causing the address plate while in printing position relative to the page form to be uncovered, whereby a new plate may be conveniently substituted.

63. The combination, with a printing member, of a roller platen, an eccentric shaft on which the platen is mounted, a friction device within the platen bearing against the interior of the platen and the exterior of the shaft, and means for rotating the platen.

64. The combination, with a printing member, of a hollow roller platen, an eccentric shaft on which the platen is mounted, a sinusoidal spring within the platen bearing against the interior of the platen and the exterior of the shaft; and means for rotating the platen.

65. The combination with a printing member, of a roller platen, an eccentric shaft on which the same is mounted, means for holding the shaft against accidental displacement while allowing sufficient force to give it a partial rotation, a friction device between the platen and shaft, and means for rotating the platen.

66. The combination of a movable printing member, a roller platen, an eccentric shaft on which the platen is mounted, a leaf spring within the platen bearing against the interior of the platen and the exterior of the shaft, and gearing between the platen and printing member.

67. The combination, with a type carrying member adapted to move back and forth, a ribbon spool carried by such member, a form carried by such member adapted to be periodically covered and uncovered by the ribbon from the spool, two platens having their axes side by side and one coacting with a certain part of the form and the other with a greater portion including the part just mentioned, and means for feeding the ribbon.

68. In a duplicating machine, the combination, with a printing member adapted interchangeably to move back and forth or to rotate continuously, an eccentrically mounted roller platen, and a friction device between the platen and its mounting, whereby the platen may rotate continuously but the movement of the printing member in one direction automatically throws the platen to idle position and the movement in the other direction automatically throws it to active position.

69. The combination of a movable printing member, cylindrical and segmental platens therefor, and a clutch between the segmental platen and printing member adapted to turn the platen into active operation only on one stroke of the printing member.

70. The combination of a printing member mounted to turn about an axis in either direction, a coöperating platen mounted to turn about an axis and having a segmental acting surface, gearing between the printing member and platen, and a clutch included in said gearing and adapted to turn the platen through active position on one movement of the printing member, and to turn it to idle position and thereafter leave it at rest on the other movement of the printing member.

71. The combination of a printing member mounted to turn on an axis, a platen mounted to turn on an axis, gearing between the printing member and platen, said gearing including a movable dog adapted to lock or release the platen, and a stationary cam for controlling said dog.

72. The combination of a printing member adapted to turn about an axis and having a gear, a segmental platen, a rotary member geared with the gear of the printing member, a dog carried by said rotary member and adapted to engage or release the platen, and a stationary cam for controlling said dog.

73. The combination of a member mounted to turn on an axis, a body form carried by such member, a coöperating roller platen, an inking fabric having at least one end mounted on the member, and an address plate removably mounted on the member in fixed relation to the body form and alternately covered and uncovered by the fabric.

74. In a machine of the character described, the combination, with a movable member adapted to carry a form for the body of the letter and a changeable address form, of two platens, one cylindrical and one segmental, and means whereby the cylindrical platen coöperates with both the body and address, and the segmental platen with the address only, while the latter preserves its relation with the body, whereby the machine may print addressed letters and corresponding envelops.

75. In a machine of the character described, the combination of means for carrying a form for the body of the letter and a changeable address form, of two rotating platens mounted on parallel axes side by side, and means whereby one coöperates with both the body and the address form and the other with the address form only, while such address form preserves its relation to the body, whereby the machine may print addressed letters and corresponding envelops.

76. In a machine of the character described, the combination with a member adapted to carry rows of type with which to print the body of a letter, and a removable address plate, of two platens coöperating with the member while printing by rolling contact, and means whereby one platen coöperates with both the body of the letter and the address plate and the other with the address plate only, while it is in the same position with reference to the body whereby the machine may print addressed letters and corresponding envelops.

77. In a machine of the character described, the combination with means for carrying a form for the body of a letter and a changeable address form, of two rotative platens or parallel axes, means whereby one coöperates with both the body and address and the other with the address only, and a single inking ribbon through which both the combined and single impressions are made, whereby the machine may print addressed letters and corresponding envelops.

78. The combination of a rotative member adapted to carry a body form for printing, a removable address form, means for holding the same on the rotative member in spaced relation with the body form, a platen with which the body form and address form successively coact when said member is turned about its axis, and a subsequently acting platen adapted to coact with the address form while it is in the same spaced relation with the body form without printing from the body form.

79. The combination of a rotative member adapted to carry a body form for printing, a removable address form, means for holding the same on the rotative member, a platen with which the body form and address form successively coact when said member is turned about its axis, a platen adapted to coact with the address form only, and a clutch for controlling the action of the last mentioned platen.

80. The combination of a rotative member adapted to carry a body form for printing, a removable address form, means for holding the same on the rotative member in spaced relation with the body form, a platen with which the body form and address form successively coact when said member is turned about its axis, a fabric through which the two forms print, and a subsequently acting platen adapted to coact with the address form while it is in the same spaced relation with the body form without printing from the body form.

81. The combination of means for holding a page form and an address form, an inking fabric adapted to extend over both forms, and means for automatically printing alternately both forms and the address form through such fabric, and means between imprints for uncovering the address form, the printing means including two platens, one adapted to coöperate with both forms and the other with the address form only.

82. The combination, with an oscillatable member arranged to carry a body form and a changeable address form, of two platens, means whereby one coöperates with the body and address and the other with the address only, and an inked ribbon mounted in part off of the member and in part on it and coöperating with both forms.

83. The combination, with an oscillatable member arranged to carry a body form and a changeable address form, of two platens, means whereby one coöperates with the body and address and the other with the address only, a spring barrel mounted off of the oscillating member, and an inked fabric having one end mounted thereon and passing between the oscillating member and the main platen.

84. The combination of a drum having rotative movement and provided with means for carrying a page form of type, of a changeable address plate, a rotary platen adapted to coöperate with both the body form and the address plate as they move past it, an inked fabric extending between said platen and the body and address, and a spool independent of the drum and carrying an end of said fabric, the other end being carried by the drum.

85. The combination of a printing drum adapted to turn in either direction and carry a page form and an address form, means whereby rotative movement in one direction may print both forms and means whereby rotative movement in the opposite direction prints simply the address form, a ribbon spool independent of the drum, and a fabric connected at one end with the drum and at the other with the spool and adapted to lie over each form while it is printing, the fabric periodically uncovering the address form.

86. The combination of a member mounted to turn on an axis in either direction, a coöperating platen, an inking fabric mounted partly on and partly off of said member, and an address plate removably mounted on the member and alternately covered and uncovered by the fabric.

87. In an addressing and printing machine, the combination of a member mounted to turn on an axis and carry a body form, a removable address plate, a rotary platen mounted to extend across both the body and address plate and coöperate with both as the member turns, an inked fabric through which the body and address are printed, a spool mounted parallel with the axis mentioned and independently of said member and carrying the wound up end of the fabric, and a spring adapted to act on said spool in the direction to wind in the fabric.

88. The combination of a rotative member adapted to carry a printing form, a spool carried by said member, a spool carried externally of said member, a fabric mounted on said spools, a platen, gearing between the platen and rotative member, an eccentric shaft for the platen adapted to be turned, and a friction device between the platen and said shaft.

89. In a printing machine, three coöperating impression elements, one a type form having a plurality of rows of type for printing the body of a letter and the remaining two platen members arranged in series, a filling in type holder removably placed in said form and adapted to hold type composing the name and post office of an addressee accompanying said body, and means for positioning envelops with reference to the filling in type holder in said form, one of said platen elements being adapted to coöperate with all of the type in said form and filling in type holder and the other acting at a different time from the first and coöperating only with said type of said holder in said form.

90. In a printing machine, coöperating impression elements, one a type form having a plurality of rows of type for printing a body portion of a letter and the other platen members arranged in series, a filling in type holder removably placed in said form, said type holder serving to hold type composing the name and post office of an addressee, means for positioning sheets of printing material with reference to said form to print from type in said form and holder, and means for positioning envelops with reference to the filling in type holder in said form to print only from type in said holder, one of said platen members coöperating with type in said form and holder and the other platen member coöperating with type in said holder only, whereby printing impressions are made successively suitable to compose an entire letter form and to address the envelop from part of the same type.

91. In a printing machine, coöperating impression elements, one a type form having a plurality of rows of type for printing the body of a letter and the other two platen members, a filling in type holder adapted to be removably placed in said form and holding type composing the name and post office of an addressee, and means adjustable longitudinally and transversely for positioning envelops with reference to the filling in type holder in said form, one of said platen members coöperating with type in said holder only to address an envelop and the other acting at a different time and cooperating with all of the type in said form and holder to print the body of a letter and the accompanying name and post office of an addressee.

92. In a printing machine, three coöperating impression elements, one a type form and the other two platen rollers arranged in series, a filling in type holder adapted to be removably placed in said type form to print a name and post office of an addressee, and means for positioning printing material with reference to the filling in type holder in printing position to print only from the type in said holder, one of said rollers coöperating with all of the type in said form and holder and the other only with type in said holder.

93. In a printing machine, three coöperating impression elements comprising two platen rollers and a type form containing a removable filling in type holder adapted to print the name and post office of an addressee, means for positioning sheets of printing material with reference to said form to print from all of the type in said form, and means for positioning envelops with reference to said filling in type holder to print only from type in said holder, said rollers being adapted to act successively and one having its surface coöperating with all of the type in said form and the surface of the other limited to coöperate only with type in said holder.

94. In a printing machine, three coöperating impression elements, one a type form and the other two platen rollers adapted to act in series on said form, a filling in type holder adapted to be placed in special relation with said form and print the name and post office of an addressee, means for positioning sheets of printing material with reference to said form to print from type in the main body and from said type holder, and means for positioning envelops with reference to said type holder to print from type composing only the name and post office of an addressee, one of said rollers being adapted to coöperate with the type composing the main body and filling in type holder, and the other roller adapted to coöperate only with the type in said filling in type holder.

95. In a printing machine, a type form having an inserted portion, and two platens arranged in series and adapted on each cycle of the machine and while said inserted portion remains stationary in said form to coöperate one with type in the entire form including the inserted portion and the other with type in the inserted portion only, for the purposes specified.

96. In a printing machine, a type form having an inserted portion, two platens arranged in series and adapted on each cycle of the machine and while said inserted portion remains stationary in said form to coöperate one with type in the entire form including the inserted portion, and the other with type in the inserted portion only, and means for positioning printing material to register with type in the entire form and with type in said inserted portion.

In testimony whereof, I hereunto affix my signature in the presence of two witnesses.

HARRY C. GAMMETER.

Witnesses:
  ALBERT H. BATES,
  WALTER LE ROY STORY.

Copies of this patent may be obtained for five cents each, by addressing the "Commissioner of Patents, Washington, D. C."